US008925707B2

(12) United States Patent  
Chojnacki

(10) Patent No.: US 8,925,707 B2  
(45) Date of Patent: Jan. 6, 2015

(54) APPARATUS, SYSTEM AND METHOD FOR SORTING ROD-LIKE ELEMENTS

(71) Applicant: International Tobacco Machinery Poland Sp. z.o.o., Radom (PL)

(72) Inventor: Wojciech Jerzy Chojnacki, Radom (PL)

(73) Assignee: International Tobacco Machinery Poland Sp. z.o.o., Radom (PL)

( * ) Notice: Subject to any disclaimer, the term of this patent is extended or adjusted under 35 U.S.C. 154(b) by 0 days.

(21) Appl. No.: 13/899,866

(22) Filed: May 22, 2013

(65) Prior Publication Data

US 2013/0313069 A1 Nov. 28, 2013

(30) Foreign Application Priority Data

May 23, 2012 (PL) .......................................... 399280

(51) Int. Cl.
 *B65G 47/10* (2006.01)
 *B65G 47/46* (2006.01)
 *A24C 5/36* (2006.01)
 *B07B 13/07* (2006.01)

(52) U.S. Cl.
 CPC . *B65G 47/46* (2013.01); *A24C 5/36* (2013.01); *B07B 13/07* (2013.01)
 USPC .......................................... 198/367; 209/521

(58) Field of Classification Search
 USPC .............. 198/367, 717, 725–735.6, 348, 443, 198/445, 446; 209/517, 521, 535, 707, 660, 209/675, 677, 393, 400, 352
 See application file for complete search history.

(56) References Cited

U.S. PATENT DOCUMENTS

| 2,852,136 A * | 9/1958 | Peck .............................. 209/521 |
| 3,233,613 A | 2/1966 | Korber et al. |
| 3,404,688 A | 10/1968 | Pinkham et al. |

(Continued)

FOREIGN PATENT DOCUMENTS

| DE | 1106227 B | 5/1961 |
| DE | 1532283 A1 | 1/1970 |

(Continued)

OTHER PUBLICATIONS

Polish search report filed in Polish application P.399280 on May 23, 2012.
European Search Report of Application No. EP13168507 of Sep. 25, 2013.

*Primary Examiner* — William R Harp
(74) *Attorney, Agent, or Firm* — Browdy and Neimark, PLLC

(57) ABSTRACT

Apparatus for sorting rod-like elements such as each having a defined different length, including a sorting transporter inclined with respect to the horizontal at an angle and having a longitudinal sieve element above and along which a transverse pusher slat moves to shift the elements upwards along the sieve element. The shifted elements are oriented along the pusher slats. The sieve element includes a through opening in the transporter which is divided by askew bars into at least two neighboring through sub-sections. The width and length of each section is selected specifically for one selected length of the rod-like elements so that only the rod-like elements having the length smaller or equal to the one selected length pass through the sub-sections of this section while being oriented along the pusher slats. A system including the apparatus according to the invention and a method for sorting rod-like elements are also disclosed.

18 Claims, 7 Drawing Sheets

(56) References Cited

U.S. PATENT DOCUMENTS

| | | |
|---|---|---|
| 4,367,675 A | 1/1983 | Boots |
| 4,546,886 A * | 10/1985 | Churchland et al. .......... 209/665 |
| 5,076,291 A | 12/1991 | Grove et al. |
| 5,400,909 A * | 3/1995 | Tomat et al. ................. 209/521 |
| 5,429,310 A | 7/1995 | Keller |

FOREIGN PATENT DOCUMENTS

| | | |
|---|---|---|
| DE | 2011125 B2 | 2/1973 |
| EP | 0102771 A2 | 3/1984 |
| FR | 2218145 A1 | 9/1974 |
| WO | 2012144915 A1 | 10/2012 |

\* cited by examiner

APPARATUS, SYSTEM AND METHOD FOR SORTING ROD-LIKE ELEMENTS

FIELD

The invention relates to an apparatus, a system and a method for sorting rod-like elements, in particular constituting cigarette production waste, e.g. cigarettes or their components.

BACKGROUND

In cigarette production some of the cigarettes do not meet quality requirements. A need for a solution enabling recovery of the tobacco comprised in the substandard cigarettes has been around for a long time.

Document U.S. Pat. No. 3,404,688 discloses a device for cutting open the elements comprising a double filter part and two tobacco parts, so called "double cigarettes". Such elements would be cut open when their tobacco parts are not properly filled with tobacco.

Another device for cutting open substandard "double" and "single" cigarettes is known from U.S. Pat. No. 3,233,613.

In U.S. Pat. No. 5,076,291 a device is disclosed for cutting the filters away from substandard single cigarettes which are delivered, un-ordered by a vibrating feeder onto a transporter. The cigarettes are conveyed with their axes transversal to the transporter movement direction in order to have their filters pushed out for cutting.

Document DE 1106227 presents an apparatus for cutting the filter parts away from the tobacco parts in which the cigarettes must be oriented with their filters facing the same direction depending on the position of a disc knife cutting them.

However, no devices are known in the state of art enabling sorting rod-like waste elements constituting a mixture of various types of elements, i.e. both single and double cigarettes as well as separate filter and tobacco parts. On the other hand, a device for sorting cucumbers by their lengths is known from DE 2011125B. In the disclosed device zigzag shaped pushers shift the cucumbers positioned at a certain angle along an opening with increasing width, the cucumbers falling into suitable compartments.

SUMMARY

The object of the invention is to provide a device and a system for sorting rod-like waste elements produced on various stages of the cigarette manufacture process.

Another object of the invention is to provide a method of sorting the rod-like waste elements by means of the device and the system according to the invention.

According to the invention an apparatus is provided for sorting rod-like elements, in particular constituting cigarette production waste, each element having a defined different length, comprising a sorting transporter inclined with respect to the horizontal at a certain angle, the transporter comprising a longitudinal sieve element above and along which at least one pusher slat moves, the at least one pusher slat being transversal to its movement direction and being adapted to shift the elements upwards along the sieve element, the shifted elements being oriented substantially along the pusher slats.

The apparatus according to the invention is characterized in that the sieve element comprises at least one sieve section in the form of a through opening in the transporter, the opening being divided by means of askew bars into at least two neighboring through sub-sections, the widths of the sub-sections in the respective sections, as measured in the direction parallel to the pusher slats being the same, and the bars of each section being oriented substantially at the same acute angle to the pusher slats, the width being different in each section, said width and the length of each section being selected specifically for one selected length of the rod-like elements so that only the rod-like elements having the length smaller or equal to the one selected length pass through the sub-sections of this section while being oriented along the pusher slats.

Preferably, in each section the width of the sub-sections is bigger than a half of one selected length and smaller than a half of the next longer length of the rod-like elements.

Also preferably, the length of this section is at least equal to a half of the one selected length of the rod-like element multiplied by the tangent of the angle of inclination of the bars in this section.

The rod-like elements preferably comprise one to two cigarette filter parts and/or one to two cigarette tobacco parts, the sieve element comprises four sieve sections, the width of the sub-sections of the first section is bigger than a half of the length of two filter parts and smaller than a half of the length of a tobacco part, the width of the sub-sections of the second section is bigger than a half of the length of one tobacco part and smaller than the combined length of one tobacco part and one filter part, the width of the sub-sections of the third section is bigger than a half of the combined length of one tobacco part and one filter part and smaller than the combined length of one tobacco part and two filter parts, the width of the sub-sections of the fourth section is bigger than the combined length of one tobacco part and two filter parts and smaller than a half of the combined length of two tobacco parts and two filter parts.

The angles of inclination of the bars are preferably the same in all the sections.

The angles of inclination of the may in each successive section.

Preferably, the lengths are the same in all the sections.

The lengths may also increase in each successive section.

Preferably, the pusher slats are spaced by fixed intervals so that they form between each other compartments wider than a diameter of a typical cigarette.

Also preferably, the angle of inclination of the sorting transporter is bigger than 10°, most preferably bigger than 20°.

According to the invention a system is provided for sorting rod-like elements, in particular constituting cigarette production waste, comprising the sorting apparatus according to the invention, wherein a delivery chute is located above the lower end of the sorting apparatus and separate receiving means are located below each sieve section, each one of the receiving means collecting the rod-like elements having at least one selected length.

Preferably, the angle of inclination of the sorting transporter is bigger than 10°, most preferably bigger than 20°, and the travelling speed of the pusher slats above the stationary sieve element is such that just one layer of elements is formed on the sorting apparatus.

According to the invention a method of sorting rod-like elements is provided, in particular constituting cigarette production waste, each having a defined different length, in which the elements are delivered onto a sorting transporter inclined with respect to the horizontal at a certain angle, the transporter comprising a longitudinal sieve element on and along which the elements are shifted by means of at least one pusher slat located above the transporter, upwards and along the sieve element, the shifted elements being oriented substantially transversally to the movement direction.

The method of the invention is characterized in that the elements are screened through at least one sieve section formed in the sieve element, the sieve section being in the form of a through opening in the transporter, the opening being divided into at least two neighboring through sub-sections by means of askew bars, the bars being oriented at the same acute angle to the pusher slats in each section, the widths of the sub-sections in the respective sections, as measured in the direction parallel to the pusher slats being the same, the width being different in each section, said width and the length of each section being selected specifically for one selected length of the rod-like elements so that only the rod-like elements having the length smaller or equal to the one selected length pass through the sub-sections of this section while being oriented along the pusher slats.

Preferably, the elements are screened through at least one sieve section, and in that the width of the sub-sections is different in each section and it is bigger than a half of one selected length and smaller than a half of the next longer length of the rod-like elements, while the length of this section is at least equal to a half of the one selected length of the rod-like element multiplied by the tangent of the angle of inclination of the bars in this section.

The apparatus, the system and the method according to the invention enable sorting the rod-like elements by their lengths in a simple and effective manner, in a very compact sorting apparatus which may form a part of a sorting system or a system for recovering tobacco from waste cigarettes.

BRIEF DESCRIPTION OF THE DRAWINGS

An exemplary embodiment of the subject of the invention is illustrated in the drawing, in which.

DETAILED DESCRIPTION

Figure 1:
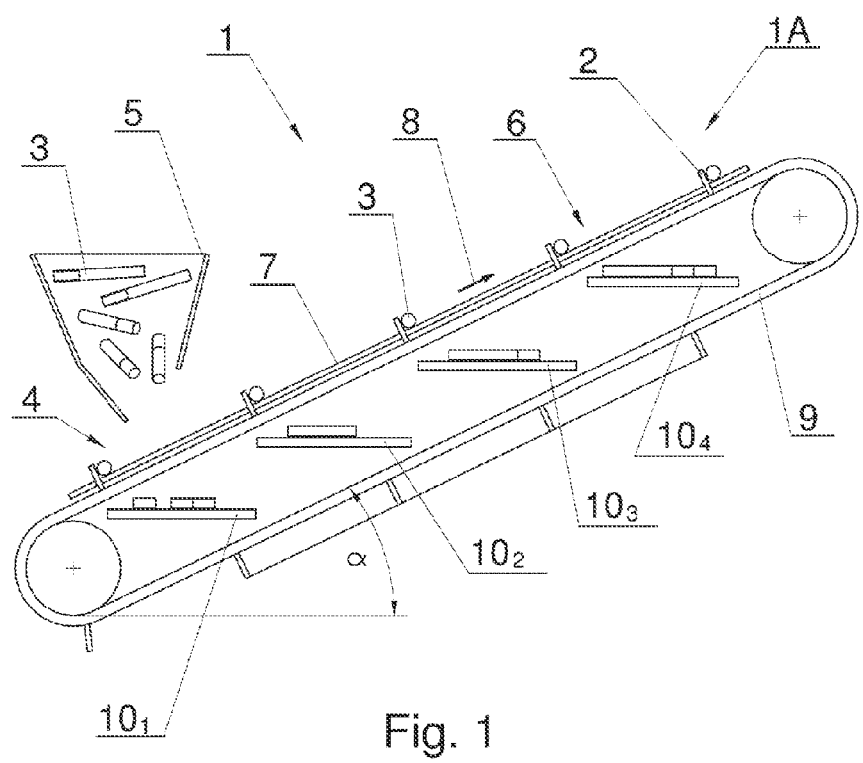
FIG. 1 schematically shows the sorting system according to the invention comprising the apparatus according to the invention, in a side view.

FIG. 1 schematically shows the sorting system according to the invention in a side view. The system comprises the sorting apparatus according to the invention, a delivery chute 5 and receiving means $10_1$, $10_2$, $10_3$, $10_4$. The sorting apparatus according to the invention comprises a sorting transporter 1 inclined with respect to the horizontal at an angle α, the transporter 1 being provided with many pusher slats 2 for shifting the rod-like waste elements $3_1$-$3_n$. In this example the pusher slats 2 are arranged at large intervals, but they may also be arranged at small intervals, e.g. slightly larger than a typical cigarette diameter. The sorting apparatus may also properly operate with just one pusher slat. The delivery chute 5 outlet is located above the lower part 4 of the transporter 1. Unordered waste rod-like elements are fed into the chute 5.

According to the invention, the rod-like elements, in particular constituting cigarette production waste, are delivered from the delivery chute 5 onto the transporter 1 and into the compartments 6 formed between the neighboring pusher slats 2, the pusher slats 2 moving over the sieve element 7. The pusher slats 2 are moved over the sieve element 7 in the direction 8 by means of driving belts 9. Separate receiving means $10_1$, $10_2$, $10_3$, $10_4$, e.g. containers or conveyors are located below the sieve element 7. The receiving means $10_1$, $10_2$, $10_3$, $10_4$ collect the sorted out waste elements, each container or conveyor collecting the elements having at least one selected length.

Figure 2:
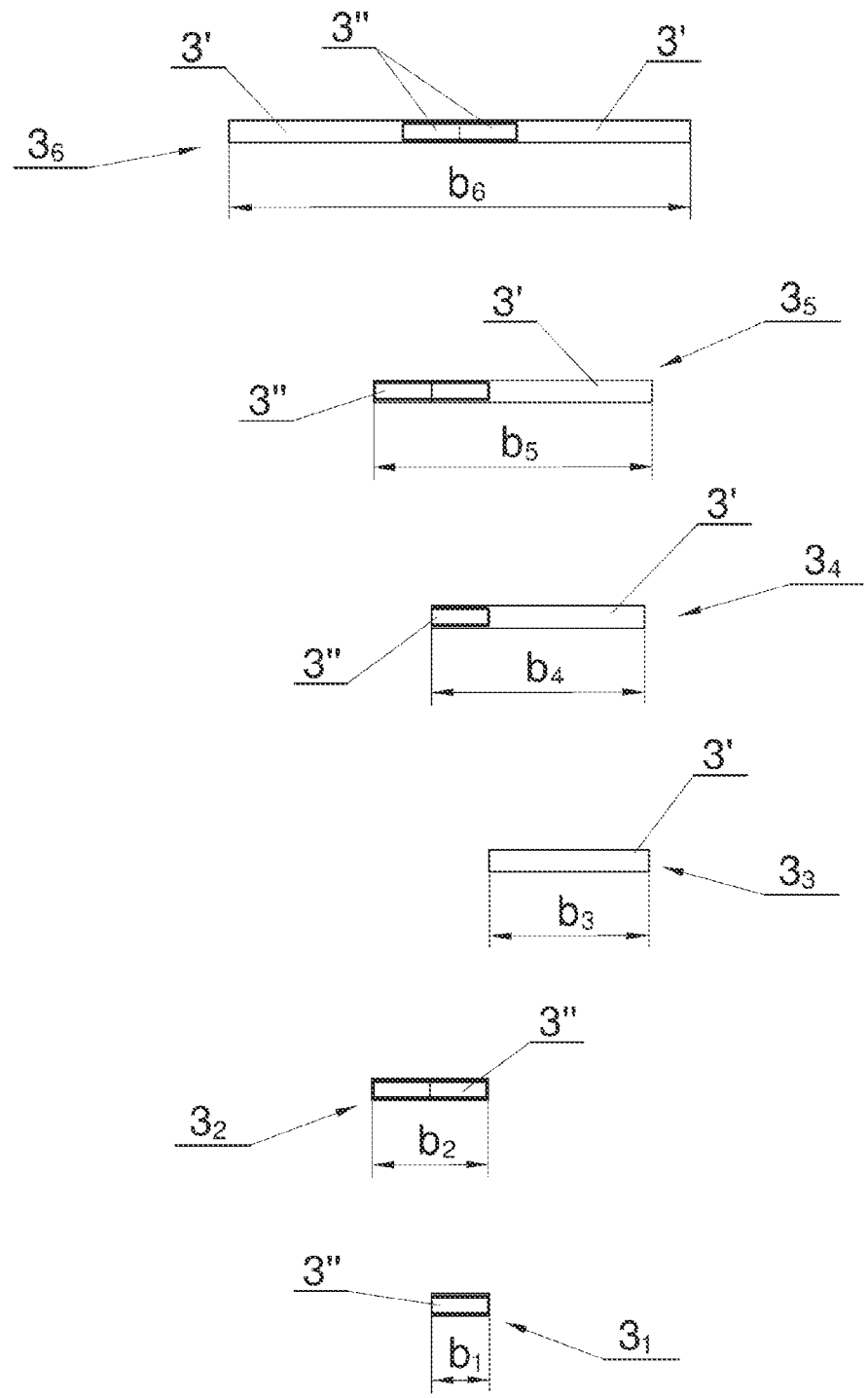
FIG. 2 shows various types of the rod-like waste elements.

FIG. 2 shows various types of the waste rod-like elements constituting cigarette production waste. Exemplary element types may comprise:

elements $3_1$, comprising just one filter part 3", having the length $b_1$ elements $3_2$, comprising two connected or not divided filter parts 3", having the combined length $b_2$ elements $3_3$, comprising just one tobacco part 3', having the length $b_3$ elements $3_4$, comprising one tobacco part 3' and one filter part 3" forming a complete cigarette, having the combined length $b_4$ elements $3_5$, comprising one tobacco part 3' and two filter parts 3", having the combined length $b_5$ elements $3_6$, comprising two tobacco parts 3' and two filter parts 3" forming two connected or not divided cigarettes, having the combined length $b_6$.

Figure 3:
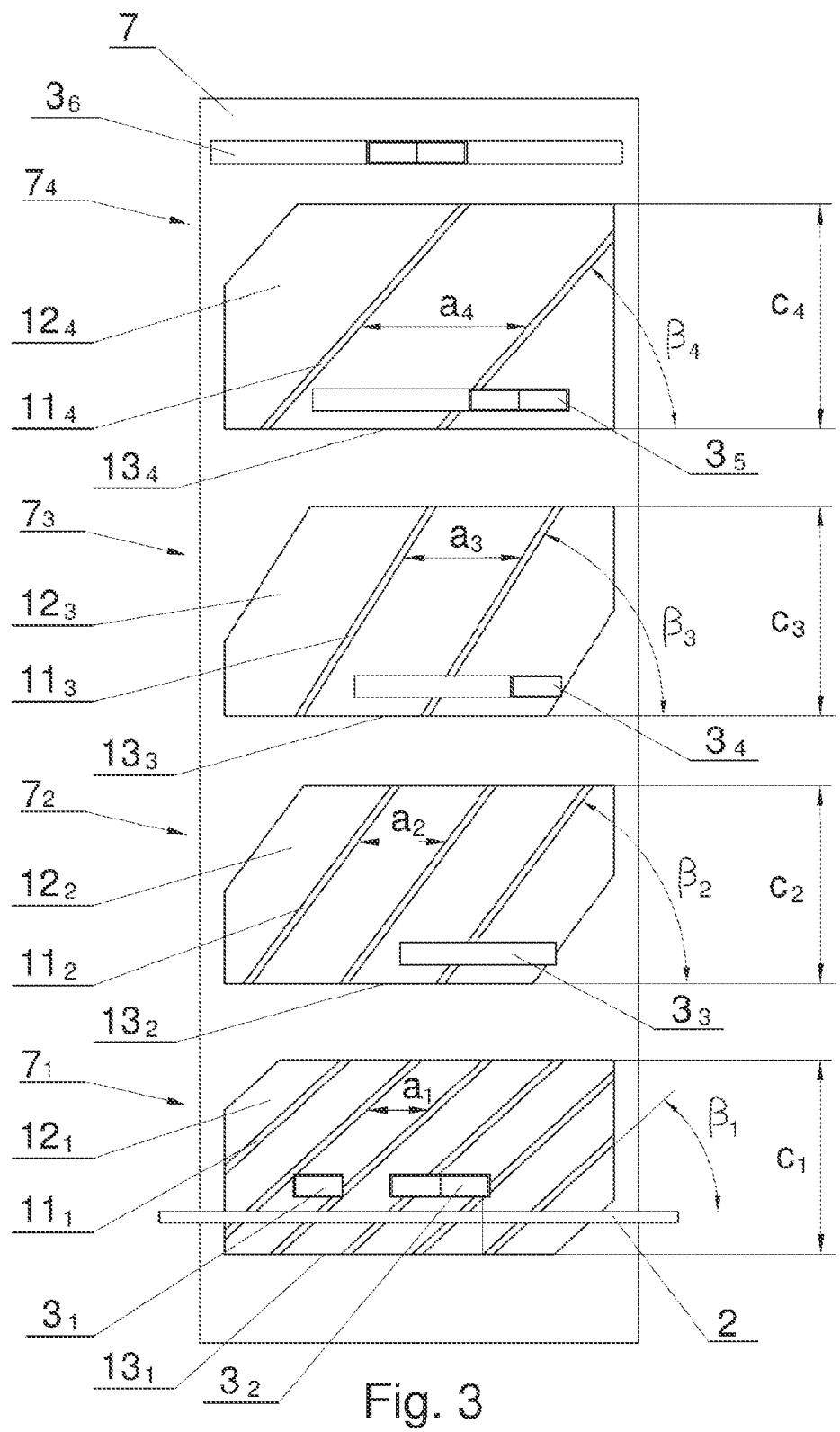
FIG. 3 shows four exemplary sieve sections.

FIG. 3 shows the sieve element 7 which may be provided with numerous through sieve sections $7_1$-$7_m$, however in this particular example there are four sieve sections $7_1$, $7_2$, $7_3$ and $7_4$ having the form of through openings, each opening being divided into at least two neighboring through sub-sections; the sub-section $12_1$—in the section $7_1$, the sub-section $12_2$—in the section $7_2$, the sub-section $12_3$—in the section $7_3$, the sub-section $12_4$—in the section $7_4$, by means of askew bars $11_1$, $11_2$, $11_3$, $11_4$, the respective waste rod-like elements $3_1$, $3_2$, $3_3$, $3_4$, $3_5$ being able to pass through each sub-section. In each section the respective elements $3_1$, $3_2$, $3_3$, $3_4$, $3_5$ are able to pass through the respective sub-sections $12_1$, $12_2$, $12_3$, $12_4$ formed between the respective bars $11_1$, $11_2$, $11_3$ and $11_4$ or between the bars and the lateral edges surrounding the respective sections. The distances between the bars are the same in each section and the elements are arranged in parallel to each other and to the pusher slats 2 during their travel along the sieve sections. Consequently, the widths $a_1$, $a_2$, $a_3$, $a_4$ of the sub-sections in the respective sections, as measured in the direction parallel to the pusher slats 2 (the widths depending on the angle $β_1$-$β_m$ of inclination of the bars in a given section), are also the same in each respective section. In FIG. 3 the angle of inclination $β_1$ of the bars $11_1$ of the section $7_1$ is measured in relation to the pusher slat 2 while in the sections $7_2$, $7_3$ and $7_4$ the angles of inclination $β_2$, $β_3$ and $β_4$ are measured in relation to the lower edges of the respective sieve sections which are substantially parallel to the pusher slats 2. The angles of inclination of the bars are also shown in FIGS. 4 and 5. Each length $c_1$, $c_2$, $c_3$, $c_4$ of the respective sections is adjusted to a selected length $b_n$ of the rod-like elements oriented along the pusher slats 2, that are meant to pass through the sub-sections between the bars in the given section. Due to such arrangement the elements having different lengths are sorted out in the respective sections. Any number of sections $7_1$, $7_2$, . . . $7_n$ may be foreseen, depending on the number of types of the elements being sorted. In FIG. 3 an example is shown in which in the first sieve section $7_1$ the elements $3_1$ and $3_2$ are being sorted out, in the second sieve section $7_2$ the elements $3_3$ are being sorted out and in the third sieve section $7_3$ the elements $3_4$ are being sorted out, while in the fourth sieve section $7_4$ the elements $3_5$ are being sorted out. The elements $3_1$ and $3_2$ will fall into the receiving means $10_1$ located below the sieve element 7, the elements $3_3$ respectively into the receiving means $10_2$, the elements $3_4$ respectively into the receiving means $10_3$, and the elements $3_5$ may be collected by additional receiving means (not shown) having the form of e.g. a container or a conveyor.

In order for the presented apparatus or system to operate and perform the method properly, in each section the width $a_m$ or the distance between the neighboring bars or the bars and the lateral edges of the openings, as measured along the pusher slats 2, should be adjusted such that it is bigger than a half of the length $b_n$ of the selected elements $3_n$ that are to pass (oriented along the slats 2) through the sub-sections between the bars or the bars and the lateral edge of the opening. This width $a_m$ must also be smaller than a half of the length $b_{n+1}$ of the next longer elements $3_{n+1}$ that are not to pass (oriented along the slats 2) through the same sub-sections.

Also, the length $c_1$-$c_m$ of each section is adjusted to the width $a_1$-$a_m$ of the sub-sections of this section and the angle of inclination $\beta_1$-$\beta_m$, so that each section sufficiently long for the elements having the selected length to manage to pass through in this section. Specifically, the points of support of the elements having a given length must change their positions in such a way that these elements are screened through the "meshes" in their selected section. A sine qua non for the proper operation of the sorting apparatus is also that the elements $3_1, 3_2, \ldots 3_n$ are oriented substantially in parallel to the pusher slats 2 while they are passing over the successive sieve sections. This requirement is realized by having the transporter and its sieve element inclined at an angle $\alpha$ that is bigger than 10°, preferably bigger than 20°, so that the shifted elements abut the pusher slats by gravitation. Preferably, and in order achieve high effectiveness of sorting, the elements form one layer on the transporter.

Figure 4A:
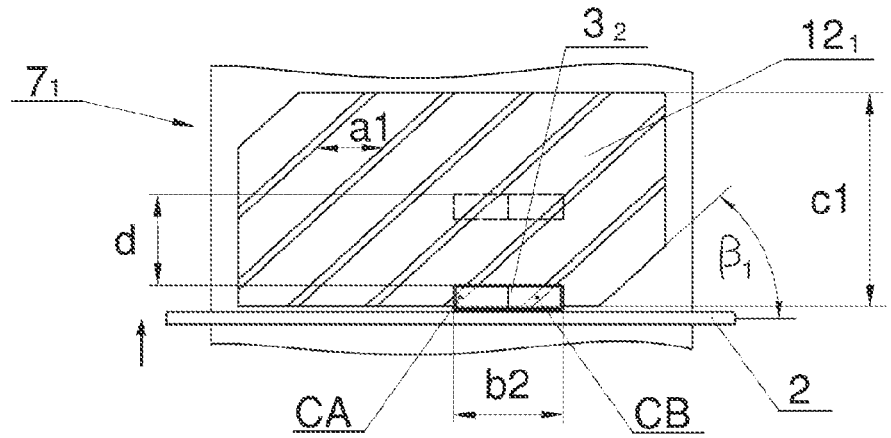
FIG. 4a, 4b, 4c show successive positions of an exemplary rod-like element moving along a sieve section, the element being sorted out in this section.
Figure 4B:
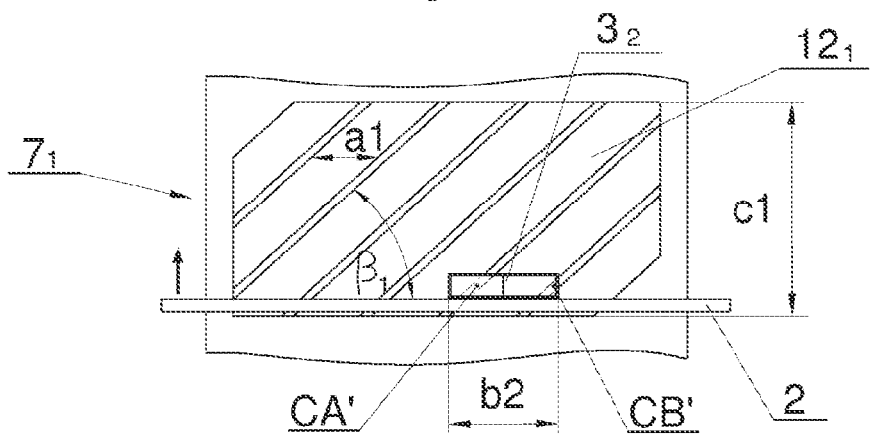
Figure 4C:
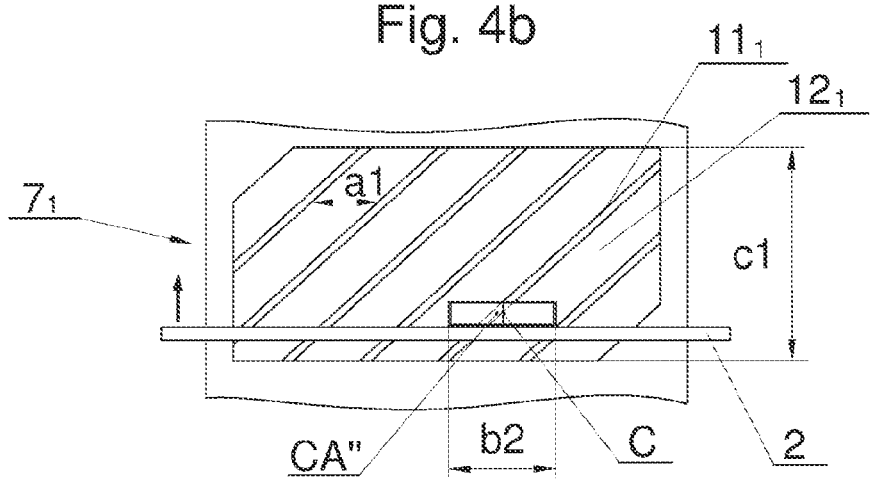

FIG. 4a, 4b, 4c schematically show how the rod-like elements move along the first sieve section $7_1$ when shifted by the pusher slats 2 that are transversal to their direction of movement. The first sieve section $7_1$ is designed in such a way that only the elements $3_1$, comprising one filter part 3" and the elements $3_2$, comprising two connected filter parts 3", are screened i.e. pass through the sub-sections $12_1$ between the bars. The distance $a_1$ between the neighboring bars, or between a bar and a lateral edge of the opening, measured along the pusher slat 2 is bigger than a half of the length $b_2$ of the element $3_2$. In other words, only the elements of the length $b_2$ (corresponding to the elements $3_2$) or smaller, e.g. $b_1$, will pass through the "meshes" of the section $7_1$. An exemplary element $3_2$ in FIG. 4a is located at the beginning of the sieve section $7_1$ and is supported by two bars $11_1$, at points CA and CB. As the pusher slat 2 is being moved (in the direction shown by an arrow in FIGS. 4a-4c), the points of support change their positions. In FIG. 4b the element $3_2$ is supported at points CA' and CB'. During its further movement, at the moment shown in FIG. 4c, the element $3_2$ has just one point of support CA" and it is obviously a momentary position. It should be noted that the point of support CA" moves away from the center of gravity C of the element as the pusher slat 2 moves along, and the element $3_2$ will eventually fall through the sub-section $12_1$. The element will fall down after it has been shifted by a certain distance depending on its initial position on the sieve element.

In the extreme situation of the element entering a given section as positioned in FIG. 4a, the element will need a maximum distance d of the movement along this section in order to fail through the sub-section $12_1$. For the above reason, as it results from geometry, the minimal length $c_1, c_2, \ldots c_m$ of the section is at least equal to a half of the length $b_n$ of the rod-like element multiplied by the tangent of the respective angle $\beta_1, \beta_2, \ldots \beta_m$. In the case of the section $7_1$, its minimal length is equal to a half of the length $b_2$ multiplied by the tangent of the angle $\beta_1$. Obviously, also the elements $3_1$ comprising just one filter part 3", having the length $b_1$, are sorted out in the section $7_1$, while all the elements longer than the elements $3_1$ and $3_2$ will be shifted on to the further sections where they will be successively sorted out.

Figure 5A:
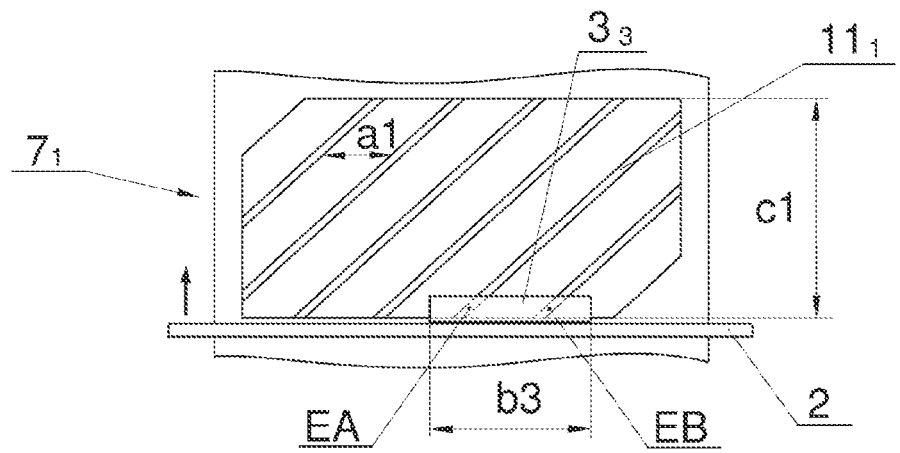
FIG. 5a, 5b, 5c show successive positions of another exemplary rod-like element moving along a sieve section, the element not being sorted out in this section.
Figure 5B:
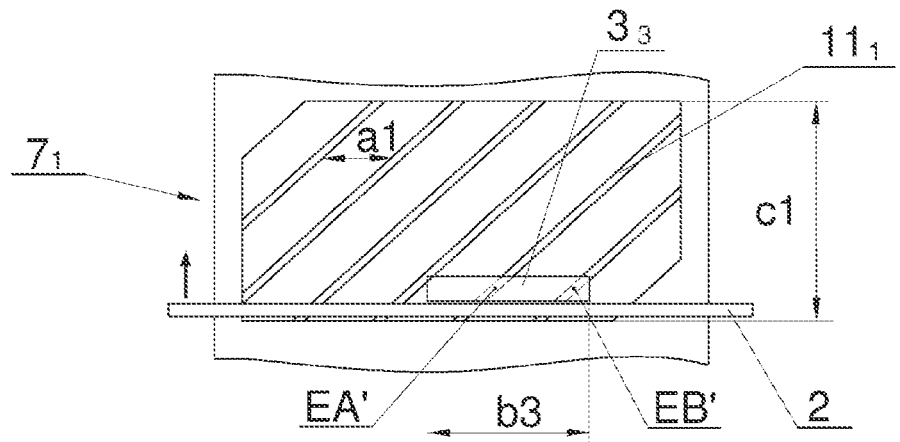
Figure 5C:
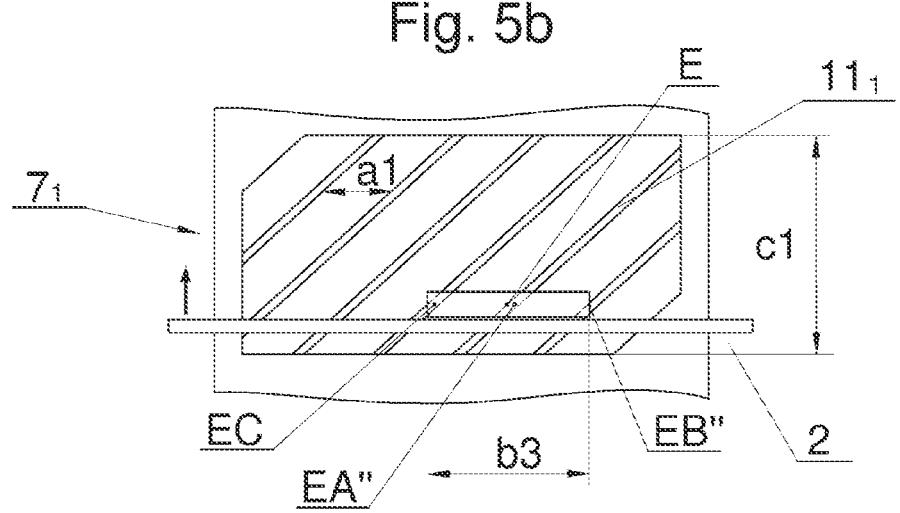

FIGS. 5a, 5b and 5c show the successive positions of another exemplary rod-like element $3_3$ having the length $b_3$ that is longer than the length $b_2$ of the element $3_2$. The movement of the element $3_3$ along the section $7_2$ is analogous to that of the element $3_2$ in the section $7_1$. At the beginning of the section the element $3_3$ has two support points EA and EB. After it has been shifted by a certain distance (FIG. 5b) the support points EA and EB change their positions towards the right side of the figure and become points EA' and EB'. In FIG. 5c the element $3_3$ has been shifted further on and it is supported now at points EA" and EB" and additionally at point EC. The element $3_3$ will be shifted along the entire sieve section $7_1$ and will not fall through its sub-sections because it will be supported all the time which will make the fall impossible. The described sequence is repeated for the successive screened elements the half length of which is longer than the width of this sub-section.

Figure 6:
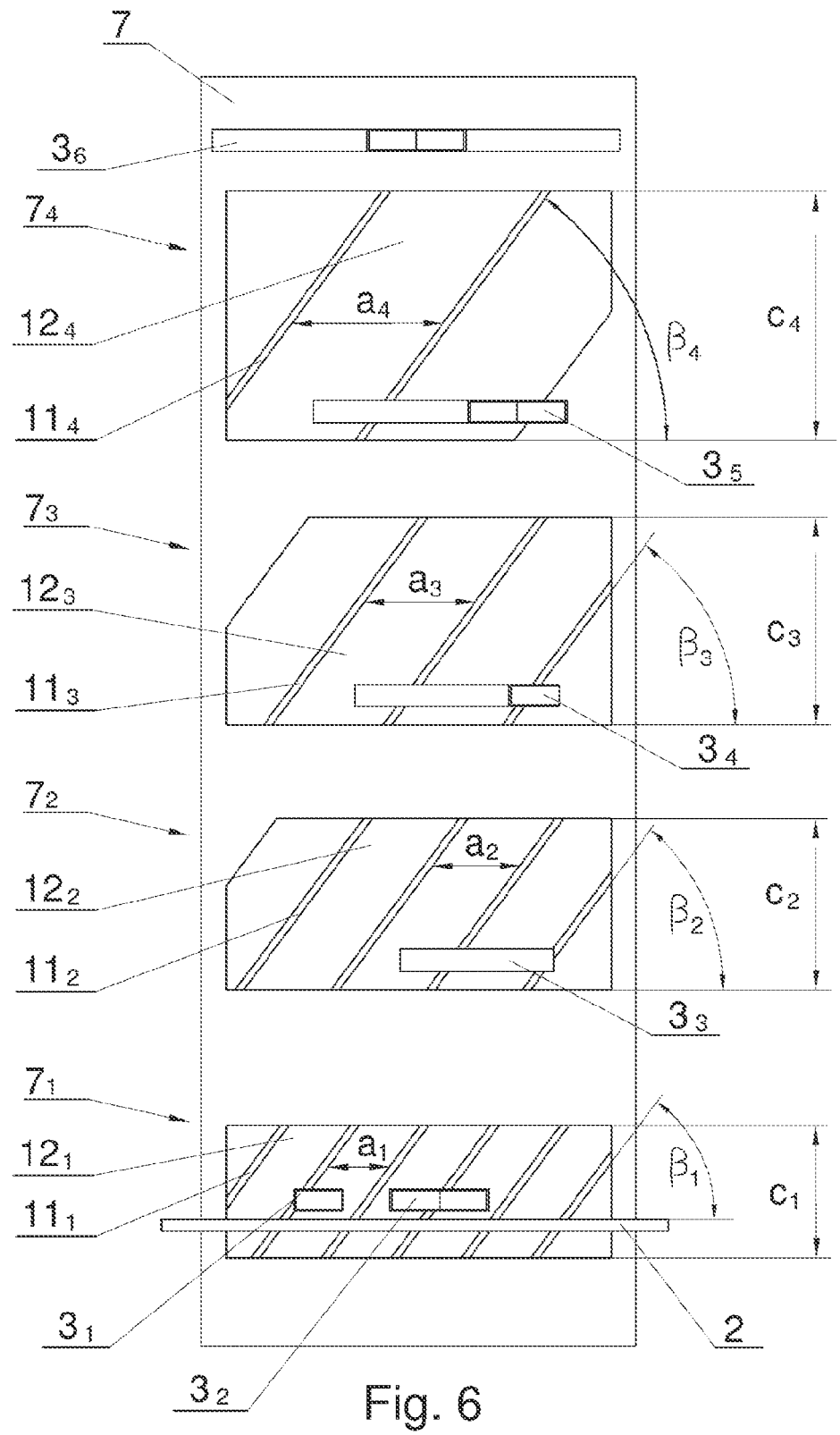
FIG. 6 shows exemplary sieve sections having the bars inclined at the same angle and different lengths.

FIG. 6 shows an embodiment of a sieve element having the sieve sections $7_1, 7_2, 7_3$ and $7_4$ the bars and lateral edges of which are inclined at the same angles $\beta_1, \beta_2, \beta_3, \beta_4$ and their lengths $c_1, c_2, c_3$ and $c_4$ are different, in this embodiment successively increasing.

Figure 7:
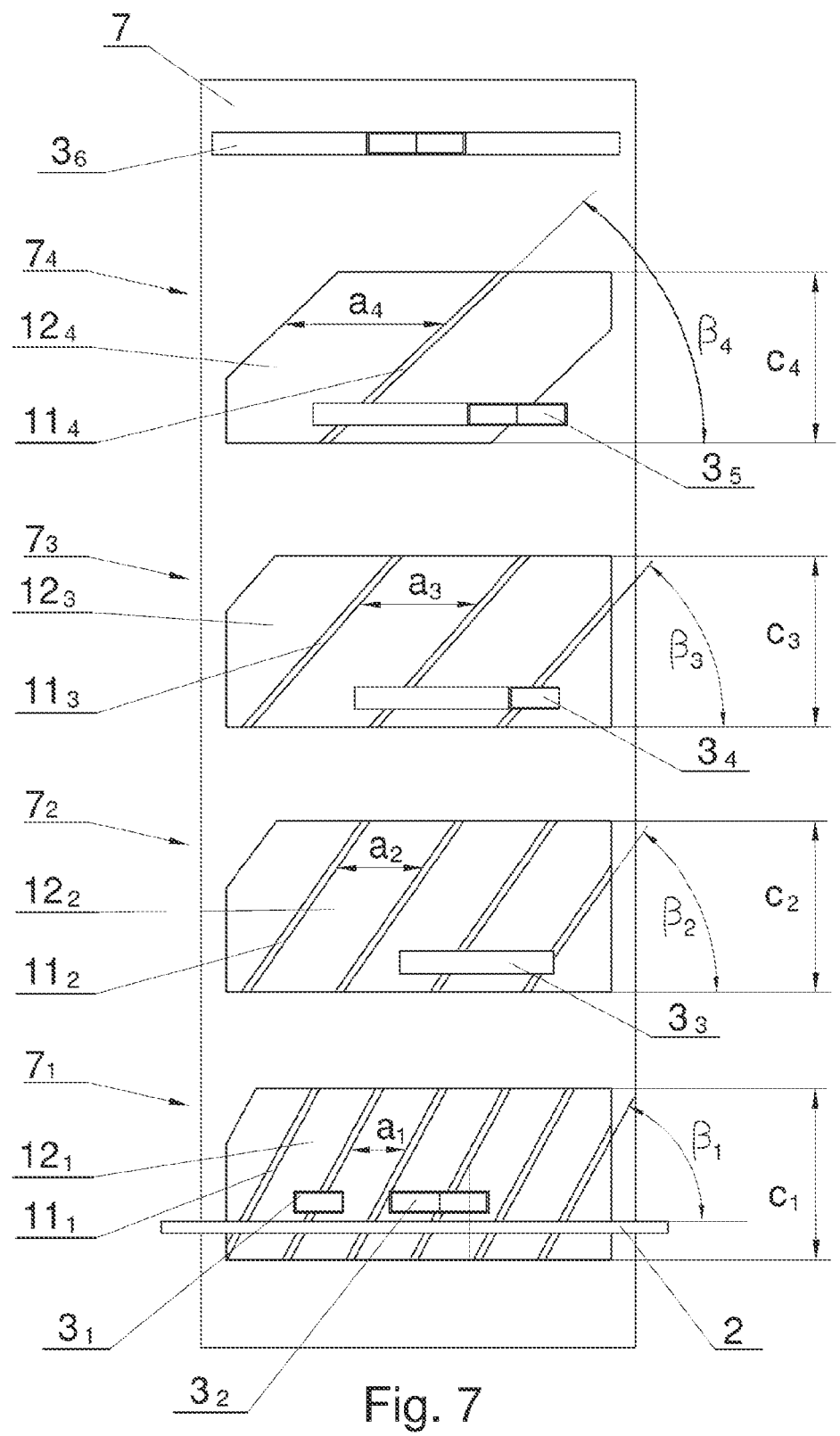
FIG. 7 shows exemplary sieve sections having the same lengths, the bars being inclined at a different angle in each section.

On the other hand, FIG. 7 shows another embodiment of a sieve element in which the lengths $c_1, c_2, c_3$ and $c_4$ are equal, while the angles of inclination $\beta_1, \beta_2, \beta_3, \beta_4$ of the bars and lateral edges are different in each section, in this embodiment successively decreasing.

The current invention is not limited to the above described embodiments and it encompasses all the other embodiments that may be covered by the appended patent claims.

The invention claimed is:

1. An apparatus for sorting rod-like elements ($3_1, 3_2, \ldots 3_n$), each element having a defined different length ($\beta_1, \beta_2, \ldots \beta_n$), said apparatus comprising:
   a sorting transporter (1) inclined with respect to the horizontal at an angle (a),
   the transporter (1) comprising a longitudinal sieve element (7) above and along which at least one pusher slat (2) moves, the at least one pusher slat (2) being transversal to its movement direction and being configured to shift the elements ($3_1, 3_2, \ldots 3_n$) upwards along the sieve element (7), the shifted elements ($3_1, 3_2, \ldots 3_n$) being oriented substantially along the at least one pusher slat (2),
   the sieve element (7) comprising at least one sieve section ($7_1, 7_2, \ldots 7_m$) in the form of a through opening in the transporter, the opening being divided by askew bars ($11_1, 11_2, \ldots 11_m$) into at least two neighboring through sub-sections ($12_1, 12_2, \ldots 12_m$), the widths ($a_1, a_2, \ldots a_m$) of the sub-sections in the respective sections, as measured in the direction parallel to the at least one pusher slat (2) being the same, and the bars ($11_1, 11_2, \ldots 11_m$) of each section being oriented substantially at the same acute angle ($b_1, b_2, \ldots b_m$) to the at least one pusher slat (2), the width ($a_1, a_2, \ldots a_m$) being different in each section ($7_1, 7_2, \ldots 7_m$), said width ($a_1, a_2, \ldots a_m$) and the length ($c_1, c_2, \ldots c_m$) of each section ($7_1, 7_2, \ldots 7_m$) being selected specifically for one selected length ($b_n$) of the rod-like elements so that only the rod-like elements having the length smaller or equal to the one selected length ($b_n$) pass through the sub-sections ($12_1, 12_2 \ldots 12_m$) of this section while being oriented along the at least one pusher slat (2).

2. The apparatus according to claim 1, wherein in each section ($7_1, 7_2, \ldots 7_m$) the width ($a_1, a_2, \ldots a_m$) of the sub-sections ($12_1, 12_2, \ldots 12_m$) is bigger than a half of one selected length ($b_n$) and smaller than a half of the next longer length ($b_{n+1}$) of the rod-like elements.

3. The apparatus according to claim 2, wherein the length ($c_1, c_2, \ldots c_m$) of this section ($7_1, 7_2, \ldots 7_m$) is at least equal to a half of the one selected length ($b_n$) of the rod-like element multiplied by the tangent of the angle ($\beta_1, \beta_2, \ldots \beta_m$) of inclination of the bars ($11_1, 11_2, \ldots 11_m$) in this section ($7_1, 7_2, \ldots 7_m$).

4. The apparatus according to claim 2, wherein the rod-like elements ($3_1, 3_2, \ldots 3_n$) comprise one to two cigarette filter parts (3") and/or one to two cigarette tobacco parts (3'), and the sieve element (7) comprises four sieve sections ($7_1, 7_2, 7_3, 7_4$), the width ($a_1$) of the sub-sections of the first section (T) is bigger than a half of the length ($b_2$) of two filter parts (3") and smaller than a half of the length ($b_3$) of a tobacco part (3'), the width ($a_2$) of the sub-sections of the second section ($7_2$) is bigger than a half of the length ($b_3$) of one tobacco part (3') and smaller than the combined length ($b_4$) of one tobacco part (3') and one filter part (3"), the width ($a_3$) of the sub-sections of the third section ($7_3$) is bigger than a half of the combined length ($b_4$) of one tobacco part (3') and one filter part (3") and smaller than the combined length ($b_5$) of one tobacco part (3') and two filter parts (3"), the width ($a_4$) of the sub-sections of the fourth section ($7_4$) is bigger than the combined length ($b_5$) of one tobacco part (3') and two filter parts (3") and smaller than a half of the combined length ($b_6$) of two tobacco parts (3') and two filter parts (3").

5. The apparatus according to claim 2, wherein the angles ($\beta_1, \beta_2, \ldots \beta_m$) are the same in all the sections ($7_1, 7_2, \ldots 7_m$).

6. The apparatus according to claim 2, wherein the angles ($\beta_1, \beta_2, \ldots \beta_m$) decrease in each successive section ($7_1, 7_2, \ldots 7_m$).

7. The apparatus according to claim 2, wherein the lengths ($c_1, c_2, \ldots c_m$) are the same in all the sections ($7_1, 7_2, \ldots 7_m$).

8. The apparatus according to claim 2, wherein the lengths ($c_1, c_2, \ldots c_m$) increase in each successive section ($7_1, 7_2, \ldots 7_m$).

9. The apparatus according to claim 2, wherein the at least one pusher slat (2) comprises a plurality of pusher slats that are spaced by fixed intervals so that they form between each other compartments wider than a diameter of a typical cigarette.

10. The apparatus according to claim 2, wherein the angle ($\alpha$) of inclination of the sorting transporter (1) is bigger than 10°.

11. The apparatus according to claim 2, wherein the angle ($\alpha$) of inclination of the sorting transporter (1) is bigger than 20°.

12. The apparatus according to claim 1, wherein the rod-like elements are cigarette production waste.

13. A system for sorting rod-like elements the system comprising the sorting apparatus according to claim 1, a delivery chute (5) located above the lower end of the sorting apparatus and separate receiving units ($10_1, 10_2, \ldots 10_m$) are located below each sieve section ($7_1, 7_2, \ldots 7_m$), each one of the receiving units ($10_1, 10_2, \ldots 10_m$) collecting the rod-like elements having at least one selected length ($\beta1, \beta2, \ldots \beta n$).

14. The system according to claim 13, wherein the angle (a) of inclination of the sorting transporter (1) is bigger than 10°, and the travelling speed of the pusher slats (2) above the stationary sieve element (7) is such that just one layer of elements (3) is formed on the sorting apparatus.

15. The system according to claim 13, wherein the angle (a) of inclination of the sorting transporter (1) is bigger than 20°, and the travelling speed of the pusher slats (2) above the stationary sieve element (7) is such that just one layer of elements (3) is formed on the sorting apparatus.

16. A method of sorting rod-like elements ($3_1, 3_2, \ldots 3_n$), each having a defined different length ($\beta1, \beta2, \ldots \beta n$), comprising:
delivering the elements ($3_1, 3_2, \ldots 3_n$) onto a sorting transporter (1) inclined with respect to the horizontal at an angle ($\alpha$), the transporter (1) comprising a longitudinal sieve element (7) on and along which the elements ($3_1, 3_2, \ldots 3_n$) are shifted by means of at least one pusher slat (2) located above the transporter, upwards and along the sieve element (7), the shifted elements ($3_1, 3_2, \ldots 3_n$) being oriented substantially transversally to the movement direction,
screening the elements through at least one sieve section ($7_1, 7_2, \ldots 7_m$) formed in the sieve element (7), the sieve section being in the form of a through opening in the transporter, the opening being divided into at least two neighboring through sub-sections ($12_1, 12_2, \ldots 12_m$) by askew bars ($11_1, 11_2, \ldots 11_m$), the bars ($11_1, 11_2, \ldots 11_m$) being oriented at the same acute angle ($\beta_1, \beta_2, \ldots \beta_m$) to the at least one pusher slat (2) in each section, the widths ($a_1, a_2, \ldots a_m$) of the sub-sections in the respective sections, as measured in the direction parallel to the at least one pusher slat (2) being the same, the width ($a_1, a_2, \ldots a_m$) being different in each section ($7_1, 7_2, \ldots 7_m$), said width ($a_1, a_2, \ldots a_m$) and the length ($c_1, c_2, \ldots c_m$) of each section ($7_1, 7_2, \ldots 7_m$) being selected specifically for one selected length ($b_n$) of the rod-like elements, wherein the step of screening results in passing only the rod-like elements having the length smaller or equal to the one selected length ($b_n$) through the sub-sections ($12_1, 12_2, \ldots 12_m$) of this section while being oriented along the at least one pusher slat (2).

17. The method according to claim 16, wherein the elements ($3_1, 3_2, \ldots 3_n$) are screened through at least one sieve section ($7_1, 7_2, \ldots 7_m$), and the width ($a_1, a_2, \ldots a_m$) of the sub-sections ($12_1, 12_2, \ldots 12_m$) is different in each section and the width ($a_1, a_2, \ldots a_m$) is bigger than a half of one selected length ($b_n$) and smaller than a half of the next longer length ($b_{n+1}$) of the rod-like elements, while the length ($c_1, c_2, \ldots c_m$) of the section ($7_1, 7_2, \ldots 7_m$) is at least equal to a half of the one selected length ($b_n$) of the rod-like element multiplied by the tangent of the angle ($\beta_1, \beta_2, \ldots \beta_m$) of inclination of the bars ($11_1, 11_2, \ldots 11_m$) in this section ($7_1, 7_2, \ldots 7_m$).

18. The apparatus according to claim 16, wherein the rod-like elements are cigarette production waste.

* * * * *